United States Patent Office 2,767,713
Patented Oct. 23, 1956

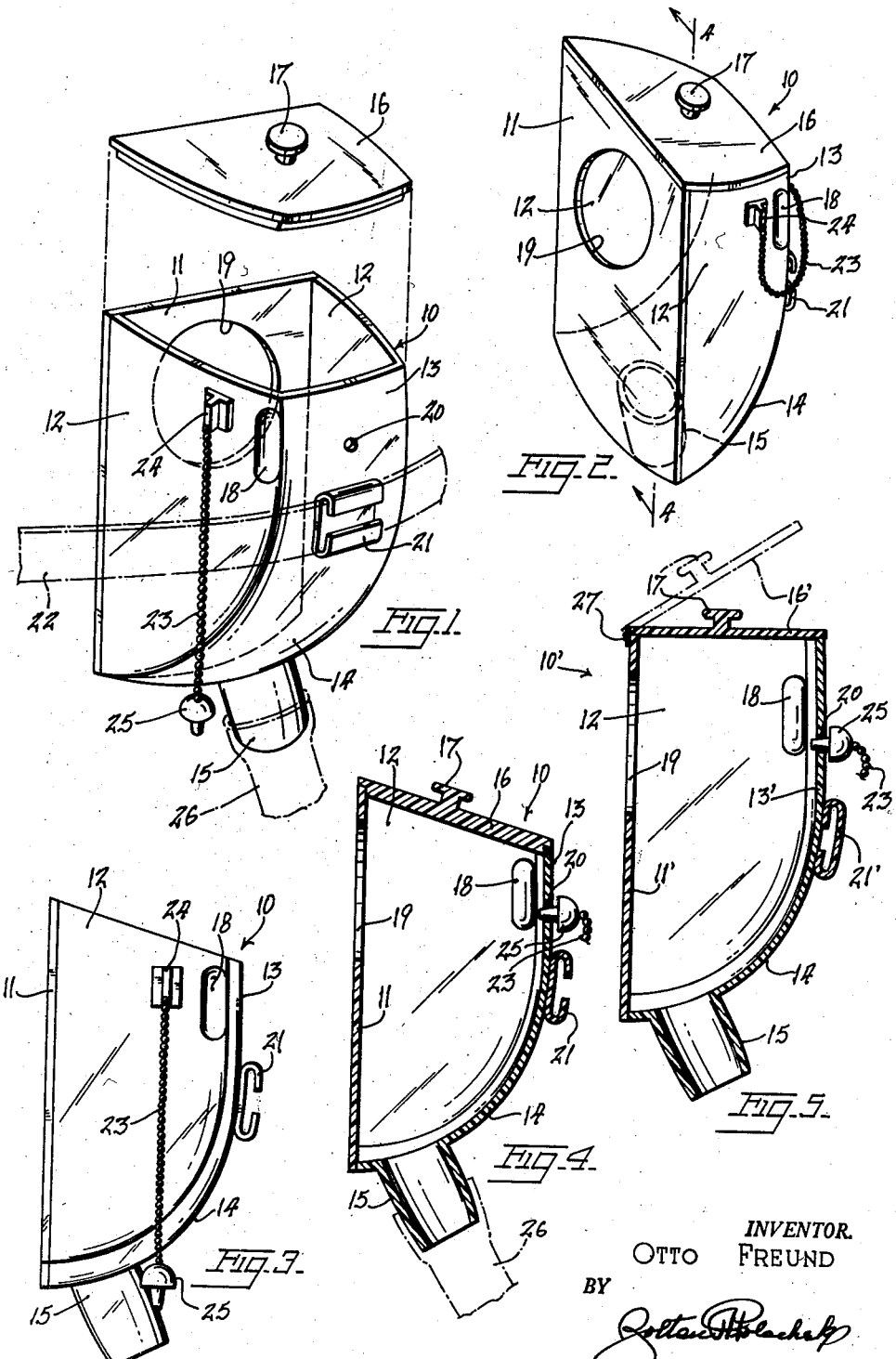

2,767,713

COLOSTOMY APPLICATOR

Otto Freund, New York, N. Y., assignor of one-half to Arthur Brown, New York, N. Y.

Application May 18, 1953, Serial No. 355,629

4 Claims. (Cl. 128—283)

This invention relates to surgical appliances and, more particularly, to new and useful improvements in a detachable appliance to be utilized by patients who have undergone a colostomy or other similar abdominal operation.

A principal object of the present invention is to provide an appliance of this nature which will be thoroughly sanitary and which will minimize the inconvenience, discomforts and handicaps in the use of a colostomy appliance.

Another object of the invention is to provide a colostomy appliance which is easily and quickly applied, which fits naturally to the body, which controls and guides the discharge from the irrigation, which is shaped so as to be readily flushed, and which is readily maintained in fluid-tight relation with the body of the wearer.

A further object of the invention is to provide a colostomy appliance which is transparent so that the operator can see directly through the device when the catheter is being manipulated and inserted through the flush tube opening in the forward side of the appliance and in alignment with the colostomy opening and which is readily sealed upon removal of the catheter from the catheter receiving opening.

It is further proposed to provide a colostomy appliance which is simple and durable in construction, pleasing in appearance and inexpensive to manufacture, compact, and highly efficient in use.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a rear perspective view of a colostomy appliance embodying one form of the invention, the cover being shown in detached position.

Fig. 2 is a front perspective view thereof with the cover in closed position.

Fig. 3 is a side elevational view thereof with the cover removed.

Fig. 4 is a vertical sectional view taken on the plane of the line 4—4 of Fig. 2.

Fig. 5 is a vertical central sectional view of a modified form of the invention.

Referring to Figs. 1 to 4, inclusive, of the drawings which illustrate the first form of the invention, the improved appliance consists of a one-piece casing 10 molded of suitable flexible, transparent plastic material which is readily cleaned and sterilized. The casing has a flat front wall 11, curved side walls 12, and a slightly curved rear wall 13 which terminates in a curved bottom wall 14. The side walls curve inwardly so that the rear wall is slightly narrower than the front wall. The bottom wall 14 is formed with a tubular outlet 15 disposed at an angle to the axis of the casing and inclined outwardly away from the front wall 11. The curved side and rear walls prevent lodgment of excretions in the casing. The top of the casing is open with the top edges of the side walls 12 slanting downwardly toward the rear wall to provide a slanting seat for a removable cover 16 having a handle 17.

The front wall may be formed separately from the other walls and cemented or otherwise secured thereto if desired. Inasmuch as the outer surface of the casing is smooth and slippery, depressions 18 are formed in the side walls 12 adjacent the rear wall for gripping by the fingers of the user to facilitate handling of the casing.

The front wall is provided with a circular opening 19 which is adapted to be placed over the opening in the abdominal wall of the patient, the edge of the circular opening being pressed into the flesh for forming a vacuum tight fit for preventing leakage of fluid. An opening 20 is formed in the rear wall 13 through which a catheter or other instrument may be inserted in a horizontal position through the circular opening 19 into the colostomy opening in the abdominal wall of the wearer. A loop 21 of plastic material with a frontal opening is fastened to the rear wall 13 by cement or in any other suitable manner for receiving a belt 22 which is adapted to be passed around the waist of the wearer for fastening the appliance to the wearer.

A chain 23 has one end fastened to a plastic bracket 24 cemented to one of the side walls 12 and its other free end supports a rubber plug 25 for sealing the opening 20 in the rear wall when the catheter is removed.

In operation, the casing is supported against the body of the patient by the belt 22 with the front wall 11 thereof properly positioned over the colostomy opening in the abdomen of the patient. The catheter or other instrument is inserted through the opening 20 in the rear wall 13 and across the device and through the circular opening 19 in the front wall 11 into the colostomy opening for proper irrigation. The catheter is then removed and the plug 25 inserted into the opening 20 for sealing the casing against the escape of fluid and gas. The contents of the casing is discharged by gravity through the outlet 15 into a tube 26 which leads to a container for disposal. After evacuation is completed, the cover 16 my be removed and the inside of the casing flushed to dislodge any refuse that might cling to the interior thereof.

Fig. 5 shows a modified form of the invention in which the casing 10' has a flat top provided with a cover 16' fastened to the top of the front wall 11' by a hinge 27 at each end. Furthermore, in this form of the invention the rear wall 13' is formed with a closed loop 21' for attaching the belt instead of a loop having a frontal opening as in the form of Fig. 1.

In all other respects, the form of the invention shown in Fig. 5 is similar to the form shown in Fig. 1 and similar reference numerals are used to indicate similar parts.

It will be apparent from the above that all of the difficulties and inconveniences inherent in the performing of colonic irrigation by a colostomy patient are overcome. The patient is enabled to assume a comfortable and natural seating position and, except during the intake of the irrigation fluid when it is desirable to hold the catheter, the hands are free.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A colostomy appliance comprising a hollow, transparent, plastic casing substantially rectangular in shape, with an open top and a closed bottom having a discharge outlet therein inclined outwardly from the front of the casing, said casing having an opening in the front for receiving a colostomy and having an aligned opening in the rear for receiving a catheter, a removable transparent plastic cover closing the open top, a chain having one end secured to the casing, and a plug secured to the other end of the chain for sealing the rear opening the side walls and the rear wall being curved, and the rear wall terminating in a curved, bottom wall, the sides of the casing having depressions for gripping by the fingers of the user.

2. A colostomy appliance comprising a hollow, transparent, plastic casing substantially rectangular in shape, with an open top and a closed bottom having a discharge outlet therein, said casing having an opening in the front for receiving a colostomy and having an aligned opening in the rear for receiving a catheter, a removable plastic cover closing the open top, a detachable plug for sealing the rear opening, and an exterior loop on the casing for receiving a flexible member for attaching the appliance to the waist of the user, the side walls and the rear wall being curved, and the rear wall terminating in a curved, bottom wall.

3. A colostomy appliance comprising a hollow, transparent, plastic casing having a front wall, a rear wall, side walls and a bottom wall with a discharge outlet therein, the top end of said casing being tapered and open, said front wall having an opening for receiving a colostomy, said rear wall having an opening aligned with the front opening for receiving a catheter, said side and rear walls having curved inner surfaces leading to the outlet, a removable plastic cover closing the open top end of the casing, a plug flexibly mounted on one of the side walls for sealing the opening in the rear wall, said side walls having depressions for gripping by the fingers of the user, and an exterior open loop on the rear wall for receiving a belt for fastening the appliance to the waist of the wearer.

4. A colostomy appliance comprising a hollow, transparent, plastic casing having a front wall, a rear wall, side walls and a bottom wall with a discharge outlet therein, the top end of said casing being flat and open, said front wall having an opening for receiving a colostomy, said rear wall having an opening aligned with the front opening for receiving a catheter, said side and rear walls having curved inner surfaces leading to the outlet, a plastic cover hinged to the front wall closing the open top end, a plug flexibly mounted on one of the side walls for sealing the opening in the rear wall, said side walls having depressions for gripping by the fingers of the user, and an exterior closed loop on the rear wall for receiving a belt for fastening the appliance to the waist of the wearer.

References Cited in the file of this patent

UNITED STATES PATENTS

| | | |
|---|---|---|
| 2,331,226 | Pritchard | Oct. 5, 1943 |
| 2,438,769 | Thomas | Mar. 30, 1948 |
| 2,540,777 | Deahl | Feb. 6, 1951 |
| 2,664,573 | Taylor | Jan. 5, 1954 |